United States Patent [19]

Dirck

[11] Patent Number: 4,679,847
[45] Date of Patent: Jul. 14, 1987

[54] REMOVABLE CAB TOP FOR VEHICLES

[76] Inventor: Ronald L. Dirck, P.O. Box 196, Warsaw, Ind. 46580

[21] Appl. No.: 880,698

[22] Filed: Jul. 1, 1986

[51] Int. Cl.⁴ ............................................. B60J 7/00
[52] U.S. Cl. ..................................... 296/218; 296/190
[58] Field of Search ....................... 296/216, 218, 190; 29/401.1

[56]  References Cited
U.S. PATENT DOCUMENTS

| 3,357,738 | 12/1967 | Bourlier | 296/216 |
| 3,972,558 | 8/1976 | Horn | 296/216 |
| 4,067,605 | 1/1978 | Green et al. | 296/218 |
| 4,238,876 | 12/1980 | Monroe et al. | 296/216 |

Primary Examiner—Robert R. Song
Attorney, Agent, or Firm—Thomas J. Dodd

[57] ABSTRACT

A removable top for a vehicle such as a pick up truck. The top includes a single of lightweight transparent material which covers a top opening and a rear opening of the vehicle cab.

6 Claims, 5 Drawing Figures

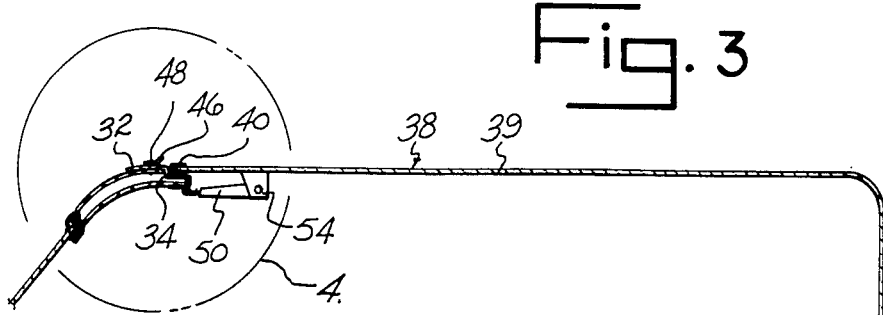
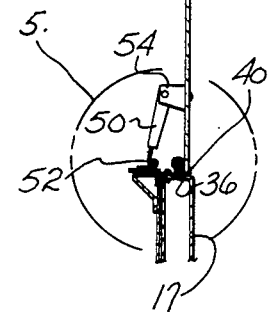
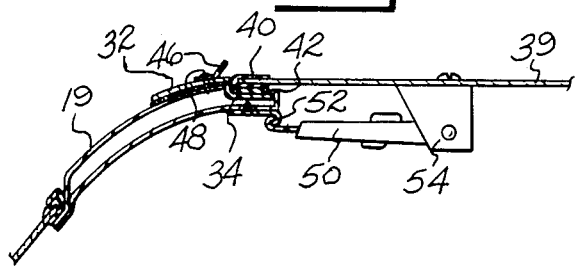
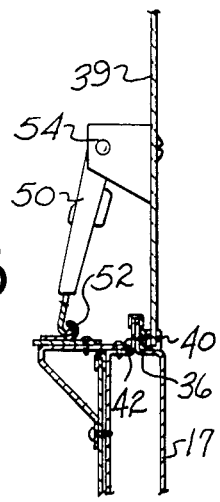

REMOVABLE CAB TOP FOR VEHICLES

SUMMARY OF THE INVENTION

This invention relates to improvements in removable tops and will have special but not limited application to a removable cab top for pick up trucks or similar vehicles.

The removable top of this invention includes a lightweight, formed sheet of transparent material which covers top and back openings in the cab of a vehicle, such as a pick up truck. The top is connected to the vehicle by removable fasteners and may be stored in the bed of the truck.

Accordingly, it is an object of this invention to provide an improved removable cap top for an a vehicle.

Another object of this invention is to provide for a removable truck cab top which is easily installed and removed from the vehicle.

Another object of this invention is to provide for a one piece transparent top and back opening cover for the cab of a pick up truck.

Other objects of this invention will become apparent upon a reading of the following description.

BRIEF DESCRIPTION OF THE DRAWINGS

A preferred embodiment of the invention has been depicted for illustrative purposes wherein:

FIG. 3 is a fragmentary sectional view taken along line 3—3 of FIG. 1.

FIG. 4 is a fragmentary detail view of one of the roof fasteners within broken circle 4 of FIG. 3.

FIG. 5 is a fragmentary detail view of another of the roof fasteners within broken circle 5 of FIG. 3.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Figure 1:
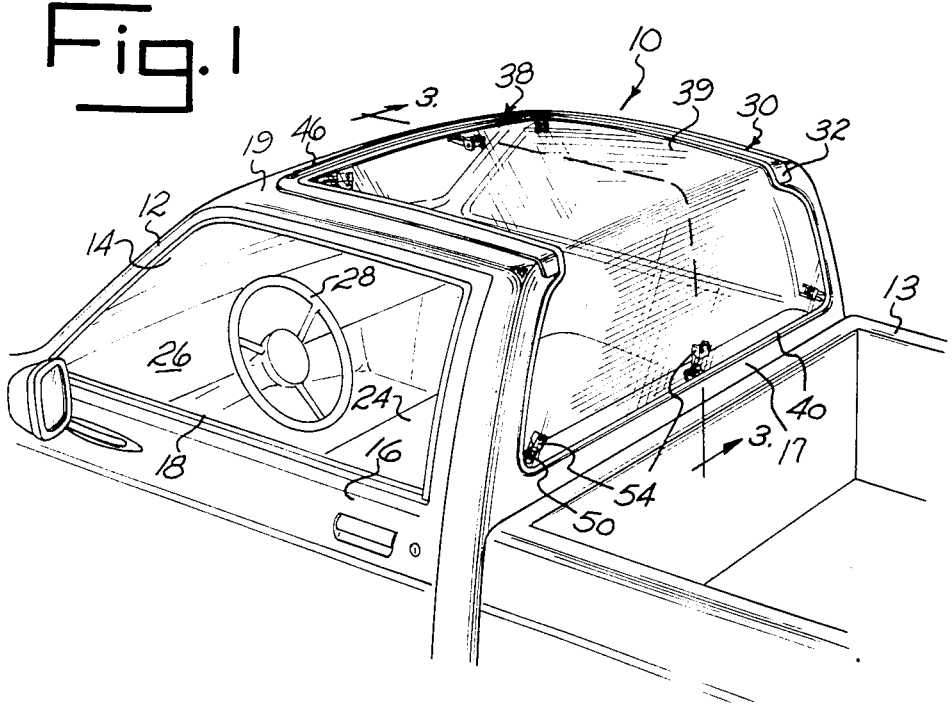
FIG. 1 is a fragmentary perspective view of a pick up truck which illustrates the removable top of this invention.
Figure 2:
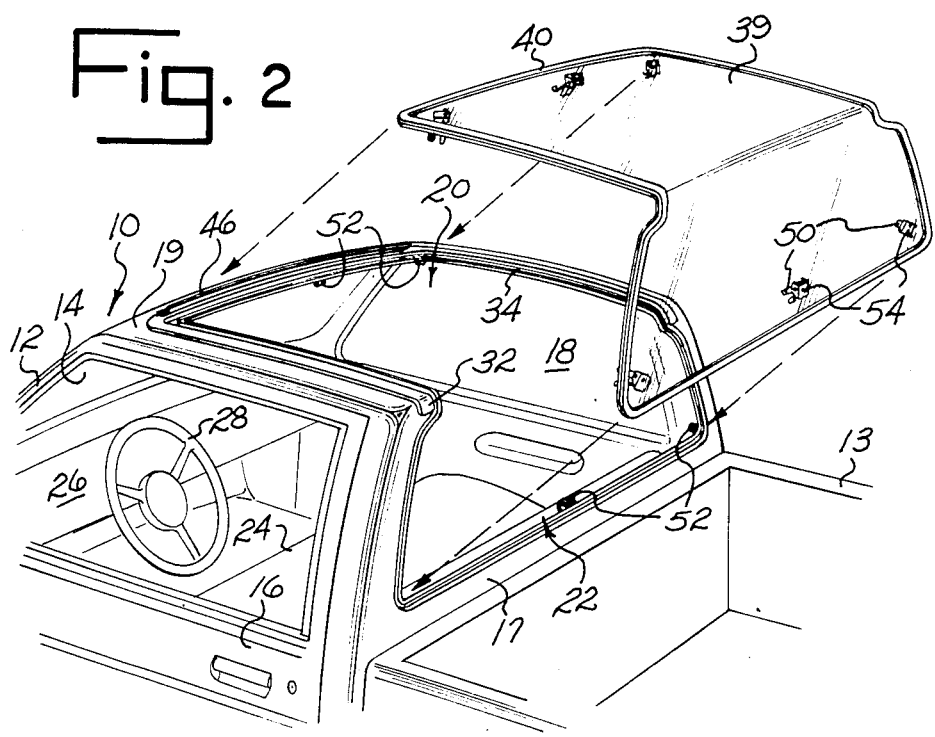
FIG. 2 is a fragmentary perspective view similar to FIG. 1 showing the top roof detached from the vehicle.

Referring now to the drawings and, in particular, FIGS. 1 and 2, reference numeral 10 refers generally to a vehicle such as the pick up truck shown in fragmentary form in FIGS. 1 and 2. Vehicle 10 preferably includes a cab 12 and bed 13. Cab 12 has a windshield 14, side doors 16 with openings covered by retractable windows 18, a roof 19 having a top opening 20 and a rear wall 17 having an opening 22 which is continuous with opening 20. Housed within cab 12 are seats 24 for the driver and passengers (not shown) as well as the dash 26, steering wheel 28 and other vehicle control systems. A U-shaped channel part 30 is secured to roof 19 about the outer margin of opening 20. Channel part 30 includes a trim part 32 fastened to cab 12 and an integral L-shaped part 34 which extends into opening 20 to support the removable top 38. Rear wall 17 includes a channel 36 which extends about opening 22 and is continuous with L-shaped part 34.

Top 38 is preferably of the L-shaped configuration shown and includes a transparent panel part 39, such as acrylic sheet material. Suitable tinting may be added to panel part 39 to prevent glare in the cab. Top 38 also includes a marginal continuous border part 40 which fits about the peripheral edge of panel part 39 to aid in seating the top within vehicle roof and end wall openings 20, 22. A seal member 42 of rubber or the like is affixed to border part 40 as shown in FIG. 4 and prevents entry of moisture into cab 12. A seal 42 may be alternatively positioned in channel part 34 and channel 36 with equal effect. A front moisture deflector 46 may be secured as by fasteners 48 to trim part 32 and vehicle 10 to enhance sealing of the top against leakage.

Top 38 is releasably connected to vehicle 10 by a plurality of fasteners 50. Any conventional quick open fastener may be used, but for purposes of illustration, six toggle latches of the general type disclosed in U.S. Pat. No. 3,519,298, incorporated herein by reference, are shown. In the illustrated embodiment, a plurality of hooks 52 (six shown) are connected at interior spaced locations in cab 12 as shown. Each toggle latch 50 is pivotally connected to a bracket 54 which is connected to top 38. The detailed operation of toggle latches 50 is described in the above said U.S. Patent and will not be repeated here.

To remove top 38, toggle latches 50 are disengaged from hooks 52. Top 38 is then lifted from roof channel part 34 and rear wall channel 36 and may be stored in the rear bed 56 of vehicle 10 until it is desired to replace the top in position as shown in FIG. 1. Toggle latches 50 are then relocked to secure top 38 in place with seal member 42 sealing the cab against the elements.

It is understood that the invention is not limited to the precise form disclosed, but may be modified within the scope of the appended claims.

I claim:

1. A removable top in combination with a vehicle, wherein said vehicle includes a cab having a roof and adjoining rear wall, said cab further including corner located support posts connected by upper side rails, an opening means formed in said cab roof between said side rails and extending into said cab rear wall between said support posts, said removable top being formed of transparent sheet material covering said cab opening means between said support posts and side rails and forming a continuation of said cab roof, fastening means associated with said top and cab for detachably connecting the top to the cab.

2. The combination of claim 1 wherein said fastening means is a plurality of toggle latches.

3. The combination of claim 1 wherein said removable top is a generally L-shaped.

4. The combination of claim 1 wherein said vehicle includes a bed located rearwardly of said cab, said opening extending downwardly of said cab rear wall to the adjacent said bed.

5. The combination of claim 1 and a channel part located about a peripheral margin of said cab opening at said roof, said channel part constituting means for supporting said removable top.

6. The combination of claim 5 and means disposed between said channel part and removable top for sealing said cab against entry of moisture.

* * * * *